US005185546A

United States Patent [19]

Kielbas et al.

[11] Patent Number: 5,185,546

[45] Date of Patent: Feb. 9, 1993

[54] ELECTROMAGNETIC ROTATION CONTROL DEVICE

[75] Inventors: Eugen Kielbas, Asperg; Erhard Renninger, Markgroeningen, both of Fed. Rep. of Germany

[73] Assignee: Robert Bosch GmbH, Stuttgart, Fed. Rep. of Germany

[21] Appl. No.: 760,792

[22] Filed: Sep. 16, 1991

[30] Foreign Application Priority Data

Nov. 28, 1990 [DE] Fed. Rep. of Germany ....... 4037793

[51] Int. Cl.[5] .............................................. H02K 1/00

[52] U.S. Cl. ..................................... 310/216; 310/89; 310/190; 310/154; 310/261

[58] Field of Search ............... 310/216, 191, 217, 209, 310/218, 190, 261, 114, 195, 154, 89, 266, 254, 257; 336/211, 212, 217, 218, 233

[56] References Cited

U.S. PATENT DOCUMENTS

| | | | |
|---|---|---|---|
| 2,435,911 | 2/1948 | van der Woude | 310/261 |
| 3,447,012 | 5/1969 | Staebler | 310/114 |
| 3,713,015 | 1/1973 | Frister | 310/114 R X |
| 4,237,396 | 12/1980 | Blenkinsop | 310/216 |
| 4,264,833 | 4/1981 | Stenudo | 310/114 |
| 4,494,517 | 1/1985 | Kratt et al. | 123/585 |
| 4,593,222 | 6/1986 | Burkel | 310/216 |
| 4,724,349 | 2/1988 | Grimm et al. | 310/216 |
| 4,916,346 | 4/1990 | Kliman | 310/216 |
| 5,032,747 | 7/1991 | Sakamoto | 310/261 |

FOREIGN PATENT DOCUMENTS 3522993 1/1987 Fed. Rep. of Germany .

*Primary Examiner*—R. Skudy

*Attorney, Agent, or Firm*—Edwin E. Greigg; Ronald E. Greigg

[57] ABSTRACT

An electromagnetic rotation control element, for an idle rotation control device for internal combustion engines, include a magnet housing with at least two magnetic poles and with a rotating armature with an even number of pole pieces that cooperate with magnetic poles, and with a restoring spring that acts on the rotating armature. For the purpose of increasing the influencing possibilities for achieving the required characterizing line of the rotation control device, each pole piece is divided into two pole piece sections, located next to each other in the axial direction and having differently formed contour lines. The one contour line has the shape of an arc of a circle, while the other contour line increasingly deviates from the one pole piece end to the other from this arc of a circle shape.

26 Claims, 2 Drawing Sheets

Fig. 2
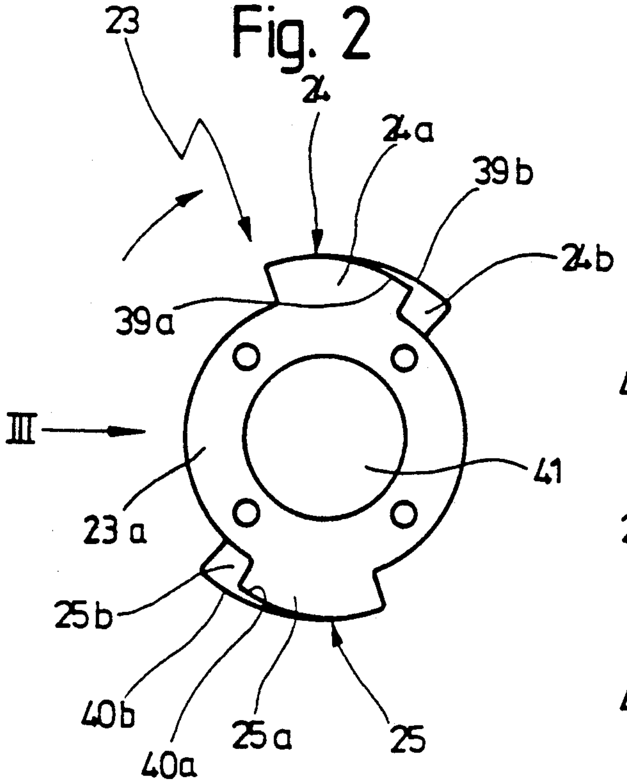
Fig. 3
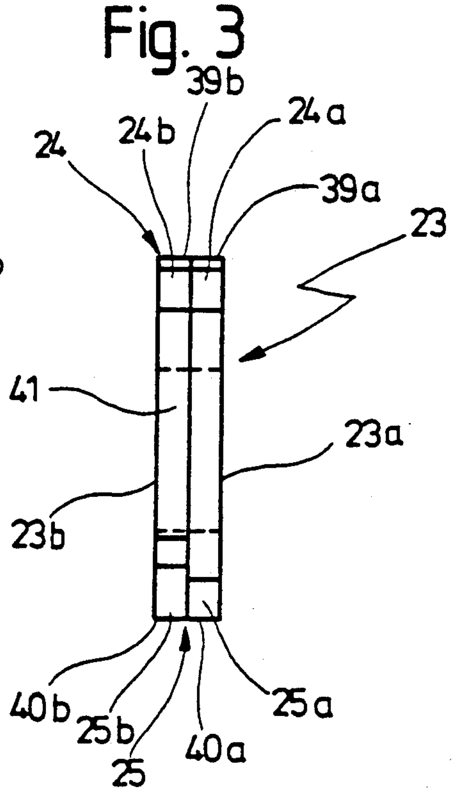
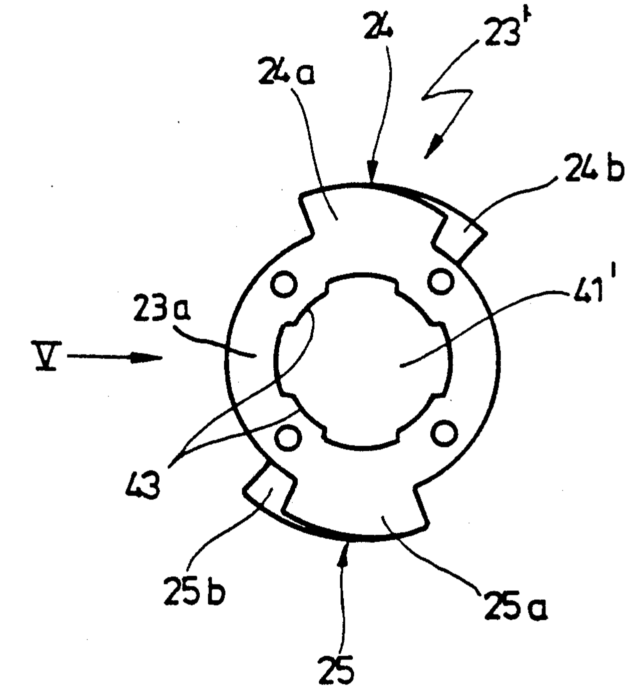
Fig. 4
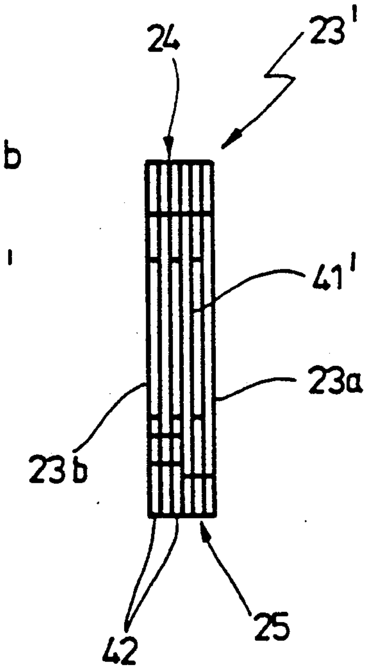
Fig. 5

ELECTROMAGNETIC ROTATION CONTROL DEVICE

The invention is related to an electromagnetic rotation control device, in particular an idle rotation control element for internal combustion engines.

BACKGROUND OF THE INVENTION

Rotation control devices of this type operate in accordance with the reluctance principle, in that a torque acting against a restoring spring is generated via the angle of rotation of a rotating armature by a change of the magnetic resistance in the working air gap between the pole pieces of the rotating armature and the magnetic poles of the magnet housing. In this case the magnetic resistance can be affected by the cross section of the active magnetic field, the field length and the relative permeability.

In a known rotation control element of this type (German Patent Disclosure DE 35 22 993 A1; U.S. Pat. No. 4,724,349 and U.S. Pat. No. 4,494,517), the gradient of surface overlapping of the magnetic pole and pole piece is utilized via the angle of rotation of the rotating armature. For this purpose the pole pieces are embodied in a wedge shape, viewed crosswise to the axis of rotation of the rotating armature, where the flanks, located opposite each other in the axial direction and running towards each other, extend straight or in a curve in order to realize a required flow-through characteristic. In the case of small surface overlapping, changes in the relative permeability of the sinter metal of the pole pieces are superimposed, where the partial areas extend as far as the saturation induction. This saturation acts in the way of an enlargement of the air gap. The amount of the air gap enlargement cannot be practically determined and in its use means an increase in the tolerance of the drive torque and thus of the characteristic line of the rotation control element.

OBJECT AND SUMMARY OF THE INVENTION

In contrast thereto, the rotation control device has an advantage that, in place of a change in the area for affecting the magnetic resistance in the air gap, the air gap itself is changed as a function o the angle of rotation. The combination of the two profile outlines at the pole piece makes possible more degrees of freedom in the selection of the pole piece width of the pole piece sections and in the size of the working air gaps and the axial thickness of the two pole piece sections. By means of an appropriate selection of these possibilities of influence, a representation of the required characteristic line of the rotation control element with narrow tolerances is possible.

Advantageous further embodiments and improvements of the rotation control element disclosed are possible.

In accordance with a preferred embodiment of the invention, the pole pieces are preferably made of one piece with a pole ring, which is seated on the rotating armature. Fastening of the pole ring onto the rotatable armature is fixed against rotation by pressing the pole ring onto the armature. The tool life of a stamping or precision stamping tool permits manufacture to closer tolerances and thus supplies closer product tolerances than a sintering tool.

When pressing the pole ring onto the rotatable armature with a press fit, the pole ring has, in accordance with a further embodiment, a passage into which at least two diametrically opposed ring segments extend. The interior ring walls of the ring segments form the press fit with the rotatable armature. The press diameter is reduced because of this embodiment of the pole ring and thus increased production assurance is achieved. Four ring segments with a width, looking in the peripheral direction, of 45° each are preferred for the press fit.

In a preferred embodiment of the invention the pole ring with pole pieces is embodied as laminated armature stampings of transformer sheet metal with a plurality of equal sheet metal cuts adjoining each other in the axial direction. Based on the increased permeability and reduced magnetic losses attained by this and taking into consideration the grain of the transformer sheet metal, further refining of the rotation control element with an even greater approach to the ideal characteristic is possible. Further improvements can be achieved by the use of materials of higher quality.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 is an enlargement of a top view of a pole ring in the rotation control device in accordance with FIG. 1, FIG. 3 is a view of the pole ring in the direction of the arrow III of FIG. 2, FIG. 4 is a top view of a pole ring in the rotation control device of FIG. 1 in accordance with a further exemplary embodiment, FIG. 5 is a view of the pole ring in the direction of the arrow V in FIG. 4.

DESCRIPTION OF THE PREFERRED EMBODIMENTS

Figure 1:
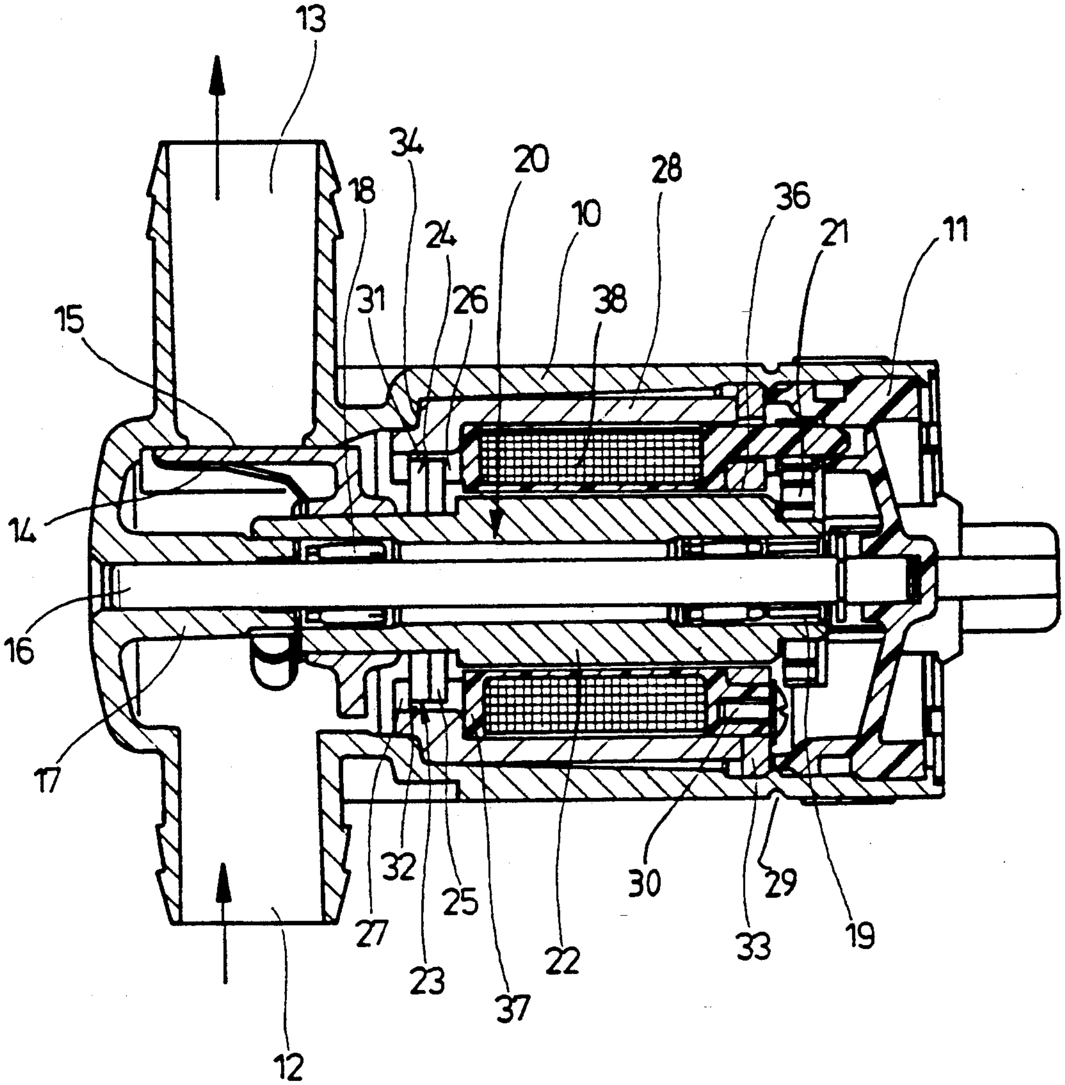
FIG. 1 is a longitudinal section of an electromagnetic rotation control device.

The electromagnetic rotation control device shown in ,longitudinal section in FIG. 1, used as an idle rotation control device for an internal combustion engine, has a cylindrical, non-magnetic housing 10 on one of the front ends of which a bearing element 11 of plastic has been inserted. An inflow connector 12 and an outflow connector 13 are embodied at the other end of the cylindrical housing 10, the axes of which are aligned with each other and extend crosswise to the longitudinal axis of the housing 10. In its use as an idle rotation control device for an internal combustion engine, the inflow connector 12 is connected with an aspiratinq tube segment upstream of a throttle valve, and the outflow connector 13 is connected with an aspirating tube segment downstream of the throttle valve. A ring-segment-shaped throttle member 14 is disposed between the inflow connector 12 and the outflow connector 13, which can be rotated around the axis of the housing 10 and in this way opens a cross section 15 in the outflow connector 13 to a greater or lesser extent.

A shaft 16 is firmly pressed with one end into the bearing element 11 and the other end is inserted in a coaxial housing tang 17 formed with the inflow and outflow conne ors. The housing tang radially extends away from the housing wall in the area of the transition from the inflow connector 12 to the outflow connector 13. A rotatable armature 20 is rotatingly seated on the shaft 16 by means of two spaced roller bearings 18, and 19. The armature is maintained in a base position by a helical spring 21, used as a restoring spring, in which one end of the restoring spring engages the rotating armature 20 and the other end of the spring engages the bearing element 11. A throttle member 14 is connected with the rotating armature 20 and fixed against rotation on the armature for rotation with the armature.

The rotatable armature 20 comprises a cylindrical pole sleeve 22 and a pole ring 23, seated on the pole sleeve 22, on which two pole pieces 24, 25, located diametrically opposed from each other, are embodied (FIG. 2). Each pole piece 24, 25 cooperates with a magnetic pole 26, 27 on a sleeve-like magnet housing 28 which surrounds the rotating armature 20 at a distance. Each magnetic pole extends radially from the magnet housing 28. The magnetic poles 26, 27 are located coaxially in relation to the pole pieces 24, 25, and a working air gap is maintained between each of them. On the end facing away from the magnetic poles 26, 27, the magnet housing 28 abuts a disk-shaped ground yoke 33, which is pressed against the magnet housing 28 by a radial wedge 29, by means of which the magnet housing 28 is supported at one end on an annular shoulder 34 in the housing 10 in the vicinity of the magnetic poles 26, 27. The ground yoke 33 has a central opening, through which the pole sleeve 22 of the rotatable armature 20 extends, leaving free an annular air gap 36. The pole sleeve 22 is enclosed by a cylindrical coil support 37 of a plastic material. An annular gap, which permits the rotation of the pole sleeve 22, remains between the latter and the coil support 37. A magnetic coil 38 is wound on the coil support 37, which has a cylindrical middle portion with outwardly extending end positioned as shown in cross-section. The coil support 37 is fastened to the ground yoke 33 by means of three screws 30.

As can be seen in the enlarged illustration of the pole rings 23 in FIGS. 2 and 3, the pole pieces 24, 25 are made of one piece with the pole ring 23. The pole ring 23 is cross-divided and comprise two pole ring halves 23*a* and 23*b* lying axially next to each other, with corresponding pole piece sections 24*a*, 25*a* or 24*b*, 25*b* lying axially next to each other. In the exemplary embodiment of FIGS. 2 and 3, the two pole ring halves 23*a* and 23*b* and the corresponding pole piece sections 24*a* and 24*b* or 25*a* and 25*b* have the same axial thickness. However, it is possible to choose the latter to be different in the two pole ring halves 23*a* and 23*b*. The pole piece sections 24*a* and 24*b* or 25*a* and 25*b* are segment-shaped and have a different arcuate width, looking in the peripheral direction, and their contour lines additionally run differently. While the contour line 39*b* or 40*b* of the pole piece sections 24*b* or 25*b* is located on a concentric arc of a circle, the contour line 39*a* or 40*a* of the pole piece sections 24*a* or 25*a* increasingly deviates from this arc of a circle from the one end of the pole piece to the other end of the pole piece. The steady increase in the deviation from the shape of the arc of a circle extends in the direction of rotation of the rotatable armature 20, so that the working air gap 31, 32 decreases with increased turning of the pole piece sections 24*a* and 25*a* into the magnetic poles 26 and 27. The pole ring halves 23*a* and 23*b* in a stack are pushed with their passages 41 onto the pole sleeve 22 and forced on it under pressure so that the pole ring halves rotate with the pole sleeve 22.

The embodiment of the pole ring 23′ in FIGS. 4 and 5 differs from the pole ring 23 in accordance with FIGS. 2 and 3 in that the pole ring 23′ is produced with pole pieces 24 and 25 laminated from transformer sheet metal. The pole ring 23′ embodied as armature stampings consists of a plurality of equal sheet metal cuts 4 adjoining each other in the axial direction. Because of this embodiment the pole ring 23′ has a higher permeability and reduced magnetic losses. The pole ring 23′ is fixed on the pole sleeve 22 by press fitting as for the pole ring 23. For this purpose four ring segments 43 radially extending from the ring surface are provided in the passage 41′ of the pole ring 23′, which are disposed offset by the same angle of rotation on the interior circumference of the pole ring 23′. Each ring segment 43 has a width of approximately 45°. The pole ring 23′ is pushed on the pole sleeve 22 by means of a pressing tool. A reduction of the press diameter is achieved by means of the four ring segments 43. Press fitting is achieved between the interior ring walls of the ring segments 43 and the pole sleeve 22.

In the embodiments of the pole ring 23 or 23′ described here the pole piece sections 24*a* and 24*b* or 25*a* and 25*b* are embodied with different widths, however, they are aligned in the axial direction with their one end edge. Depending on the need, it is also possible for attaining the ideal characteristic of the characteristic line of the rotation control device to rotate the pole ring halves 23*a* and 23*b* in respect to each other in such a way that the edges of the borders of the pole piece sections 24*a* and 24*b* or 25*a* and 25*b* are not aligned in the axial direction. Further than that, it is possible for the pole piece sections 24*a* and 24*b* or 25*a* and 25*b* not to have the same width. In this connection it is essential that the contour lines 39*a* and 40*a* of the pole piece sections 24*a* and 25*a* and the contour lines 39*b* and 40*b* of the pole piece sections 24*b* and 25*b* take courses which deviate from each other, as described.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. An electromagnetic rotation control device, for an idle rotation control device for internal combustion engines, which comprises; a magnet housing, at least two magnetic poles embodied on said magnet housing, a rotatable armature rotatingly seated in the magnet housing, an even number of pole pieces, each pole piece supported on said armature cooperating with a magnetic pole and is coaxially disposed in relation to the at least two magnetic poles, a working air gap is formed between said at least two magnetic poles and said pole pieces, a restoring spring connected to said rotatable armature for restoring said rotatable armature to a desired position, a first pole piece (24) having first and second oppositely disposed pole piece sections (24*a*, 24*b*), a second oppositely disposed pole piece (25) having third and fourth oppositely disposed pole piece sections (25*a*, 25*b*), said first and second and said third and fourth oppositely disposed pole piece sections are placed side by side in an axial direction, said first and third oppositely disposed pole piece sections have first, second, third and fourth differently shaped contour lines (39*a*, 40*r* or 39*b*, 40*b*) as does said second and fourth oppositely disposed pole piece sections, of which said second and fourth differently shaped contour lines (39*b*, 40*b*) are in a shape of an arc of a circle and said first and third differently shaped contour lines (39*a*, 40*a*) increasingly deviate from a shape of the arc of the circle from one end of the first and third pole piece sections to an other end thereof.

2. A rotation control device in accordance with claim 1, in which said first and second oppositely disposed pole piece sections (24*a*, 24*b*) and said third and fourth pole piece sections (25*a*, 25*b*) have a different width, looking in a peripheral direction.

3. A rotation control device in accordance with claim 1, in which said first and third and said second and fourth oppositely disposed pole piece sections are disposed rotated in relation to each other in a peripheral direction.

4. A rotation control device in accordance with claim 2, in which said first and third and said second and fourth oppositely disposed pole piece sections are disposed rotated in relation to each other in a peripheral direction.

5. A rotation control device in accordance with claim 1, in which said first and second pole pieces (24, 25) are embodied on a pole ring (23; 23') seated on the rotatable armature (20) for rotation therewith.

6. A rotation control device in accordance with claim 2, in which said first and second pole pieces (24, 25) are embodied on a pole ring (23; 23') seated on the rotatable armature (20) for rotation therewith.

7. A rotation control device in accordance with claim 3, in which said first and second pole pieces (24, 25) are embodied on a pole ring (23; 23') seated on the rotatable armature (20) for rotation therewith.

8. A rotation control device in accordance with claim 4, in which said first and second pole pieces (24, 25) are embodied on a pole ring (23; 23') seated on the rotatable armature (20) for rotation therewith.

9. A rotation control device in accordance with claim 5, in which the pole ring (23; 23') is of one piece with the first and second pole pieces (24, 25).

10. A rotation control device in accordance with claim 5, in which the pole ring (23; 23') is pressed onto the rotatable armature (20) with a press fit.

11. A rotation control device in accordance with claim 9, in which the pole ring (23; 23') is pressed onto the rotatable armature (20) with a press fit.

12. A rotation control device in accordance with claim 10, in which the pole ring (23') has a passage (41'), into which at least two ring segments (43) located diametrically opposite each other extend radially from an interior ring wall of said passage (40') which provide the press fit to the rotating armature (20).

13. A rotation control device in accordance with claim 11, in which the pole ring (23') has a passage (41'), into which at least two ring segments (43) located diametrically opposite each other extend radially from an interior ring wall of said passage (41') which provide the press fit to the rotating armature (20).

14. A rotation control device in accordance with claim 12, in which a total of four ring elements (43) are provided, which are offset from each other by a peripheral angle and which each have a width, looking in a peripheral direction, of approximately 45°.

15. A rotation control device in accordance with claim 13, in which a total of four ring elements (43) are provided, which are offset from each other by a peripheral angle and which each have a width, looking in a peripheral direction, of approximately 45°.

16. A rotation control device in accordance with claim 5, in which the pole ring (23') with the first and second pole pieces (24, 25) is embodied in the form of laminated armature stampings with a plurality of equal sheet metal cuts (42) adjoining each other in an axial direction.

17. A rotation control device in accordance with claim 9, in which the pole ring (23') with the first and second pole pieces (24, 25) is embodied in the form of laminated armature stampings with a plurality of equal sheet metal cuts (42) adjoining each other in an axial direction.

18. A rotation control device in accordance with claim 10, in which the pole ring (23') with the first and second pole pieces (24, 25) is embodied in the form of laminated armature stampings with a plurality of equal sheet metal cuts (42) adjoining each other in an axial direction.

19. A rotation control device in accordance with claim 12, in which the pole ring (23') with the first and second pole pieces (24, 25) is embodied in the form of laminated armature stampings with a plurality of equal metal cuts (42) adjoining each other in an axial direction.

20. A rotation control device in accordance with claim 14, in which the pole ring (23') with the first and second pole pieces (24, 25) is embodied in the form of laminated armature stampings with a plurality of equal sheet metal cuts (42) adjoining each other in an axial direction.

21. A rotation control device in accordance with claim 5, in which the rotating armature (20) has a pole sleeve (22), which is supported via roller bearings (18, 19) on a shaft (16) extending through the magnet housing and which supports on an inner end the pole ring (23) with pole pieces (24, 25) and which extends on an outer end through a ground yoke (33) of the magnet housing (28), leaving an air gap (36) free.

22. A rotation control device in accordance with claim 9, in which the rotating armature (20) has a pole sleeve (22), which is supported via roller bearings (18, 19) on a shaft (16) extending through the magnet housing and which supports on an inner end the pole ring (23) with pole pieces (24, 25) and which extends on an outer end through a ground yoke (33) of the magnet housing (28), leaving an air gap (36) free.

23. A rotation control device in accordance with claim 10, in which the rotating armature (20) has a pole sleeve (22), which is supported via roller bearings (18, 19) on a shaft (16) extending through the magnet housing and which supports on an inner end the pole ring (23) with pole pieces (24, 25) and which extends on an outer end through a ground yoke (33) of the magnet housing (28), leaving an air gap (36) free.

24. A rotation control device in accordance with claim 12, in which the rotating armature (20) has a pole sleeve (22), which is supported via roller bearings (18, 19) on a shaft (16) extending through the magnet housing and which supports on an inner end the pole ring (23) with pole pieces (24, 25) and which extends on an outer end through a ground yoke (33) of the magnet housing (28), leaving an air gap (36) free.

25. A rotation control device in accordance with claim 14, in which the rotating armature (20) has a pole sleeve (22), which is supported via roller bearings (18, 19) on a shaft (16) extending through the magnet housing and which supports on an inner end the pole ring (23) with pole pieces with pole pieces (24, 25) and which extends on an outer end through a ground yoke

(33) of the magnet housing (28), leaving an air gap (36) free.

26. A rotation control device in accordance with claim 16, in which the rotating armature (20) has a pole sleeve (22), which is supported via roller bearings (18, 19) on a shaft (16) extending through the magnet housing and which supports on an inner end the pole ring (23) with pole pieces (24, 25) and which extends on an outer end through a ground yoke (33) of the magnet housing (28), leaving an air gap (36) free.

* * * * *